(12) United States Patent
Howes et al.

(10) Patent No.: US 11,660,996 B2
(45) Date of Patent: *May 30, 2023

(54) BRIDGE APPARATUS AND SYSTEM FOR VEHICLE TRANSPORT

(71) Applicant: Cottrell, Inc., Gainesville, GA (US)

(72) Inventors: Phillip Bryan Howes, Braselton, GA (US); Steven Thomas Sexton, Lawrenceville, GA (US); Masaru Mike Kishimoto, Gainesville, GA (US)

(73) Assignee: Cottrell Incorporated, Gainesville, GA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/348,506

(22) Filed: Jun. 15, 2021

(65) Prior Publication Data

US 2021/0309140 A1    Oct. 7, 2021

Related U.S. Application Data

(63) Continuation of application No. 16/225,247, filed on Dec. 19, 2018, now Pat. No. 11,059,411.

(51) Int. Cl.
*B60P 3/08* (2006.01)
*B60P 3/07* (2006.01)

(52) U.S. Cl.
CPC .. *B60P 3/08* (2013.01); *B60P 3/07* (2013.01)

(58) Field of Classification Search
CPC ...... B60P 3/07; B60P 3/08; B60P 1/43; B60P 1/433; B60P 1/436; B60P 1/44; B60P 1/4407; B62D 53/062; B62D 53/064; B62D 53/065

USPC .......................................................... 410/28
See application file for complete search history.

(56) References Cited

U.S. PATENT DOCUMENTS

| | | | | |
|---|---|---|---|---|
| 2,683,611 | A | * | 7/1954 | Shinn ................... B62D 53/062 280/43.11 |
| 2,687,225 | A | * | 8/1954 | Martin ...................... B60P 3/07 280/491.1 |
| 2,759,737 | A | * | 8/1956 | Manning ................. B60P 1/025 280/789 |

(Continued)

FOREIGN PATENT DOCUMENTS

| CN | 203958357 U | * | 11/2014 |
|---|---|---|---|
| CN | 203958358 U | * | 11/2014 |

(Continued)

*Primary Examiner* — Hilary L Gutman
(74) *Attorney, Agent, or Firm* — Smith Tempel Blaha LLC; Matthew T. Hoots

(57) ABSTRACT

A vehicle transport truck or trailer with a platform having at least a first section and a second section is configured such that the first section is operable to move to at least a raised position and a lowered position. A ramp is provided that connects the first section and the second section of the platform, the ramp being operable to move in conjunction with the first section. A linkage mechanism is also provided and is configured to move in conjunction with the first section of the platform. Moving the first section of the platform causes the linkage mechanism to correspondingly move the ramp such that when the first section is in the raised position the ramp is substantially aligned with the first section and when the first section is in the lowered position the ramp is not aligned with the first section.

19 Claims, 8 Drawing Sheets

(56) References Cited

U.S. PATENT DOCUMENTS

| | | | | |
|---|---|---|---|---|
| 3,084,970 | A * | 4/1963 | Day | B60P 3/08 |
| | | | | 410/29.1 |
| 3,151,884 | A * | 10/1964 | Felburn | B62D 53/065 |
| | | | | 280/441.2 |
| 3,228,546 | A * | 1/1966 | Bunch | B60P 3/07 |
| | | | | 414/537 |
| 3,589,767 | A * | 6/1971 | Stuart | B60P 3/08 |
| | | | | 410/24.1 |
| 3,779,411 | A * | 12/1973 | Moretti, Jr. | B62D 53/062 |
| | | | | 410/3 |
| 5,013,056 | A * | 5/1991 | Landoll | B60P 1/18 |
| | | | | 414/475 |
| 5,094,583 | A * | 3/1992 | Bills, Jr. | B60P 1/433 |
| | | | | 298/17 B |
| 5,490,754 | A * | 2/1996 | Voelzke | B60P 1/433 |
| | | | | 296/184.1 |
| 5,667,231 | A * | 9/1997 | Dierks | B60P 1/027 |
| | | | | 414/475 |
| 6,036,207 | A * | 3/2000 | Oehlerking | B60P 1/18 |
| | | | | 414/475 |
| 6,386,819 | B1 * | 5/2002 | Schultz | B60P 1/43 |
| | | | | 296/61 |
| 6,447,226 | B1 * | 9/2002 | Andre | B60P 1/43 |
| | | | | 410/24 |
| 7,140,820 | B2 * | 11/2006 | Chang | B60P 3/08 |
| | | | | 410/27 |
| 11,059,411 | B2 * | 7/2021 | Howes | B60P 1/43 |
| 2016/0362146 | A1 * | 12/2016 | Trowbridge | B62D 53/062 |
| 2018/0099600 | A1 * | 4/2018 | Smith | B65G 69/30 |
| 2020/0031267 | A1 * | 1/2020 | Pelzer | B60P 1/64 |
| 2021/0179207 | A1 * | 6/2021 | Hwang | B62D 53/061 |

FOREIGN PATENT DOCUMENTS

| | | | | |
|---|---|---|---|---|
| CN | 204024141 U | * | 12/2014 | B62D 21/14 |
| CN | 115107891 A | * | 9/2022 | |
| DE | 10049399 A1 | * | 3/2002 | B60P 1/433 |
| EP | 0040542 A1 | * | 11/1981 | |
| FR | 1493097 A | * | 8/1967 | |
| KR | 20180008160 A | * | 1/2018 | |
| KR | 20220002740 U | * | 11/2022 | |
| KR | 102485372 B1 | * | 1/2023 | |
| WO | WO-9110576 A1 | * | 7/1991 | |
| WO | WO-2016108788 A1 | * | 7/2016 | B60P 1/43 |

\* cited by examiner

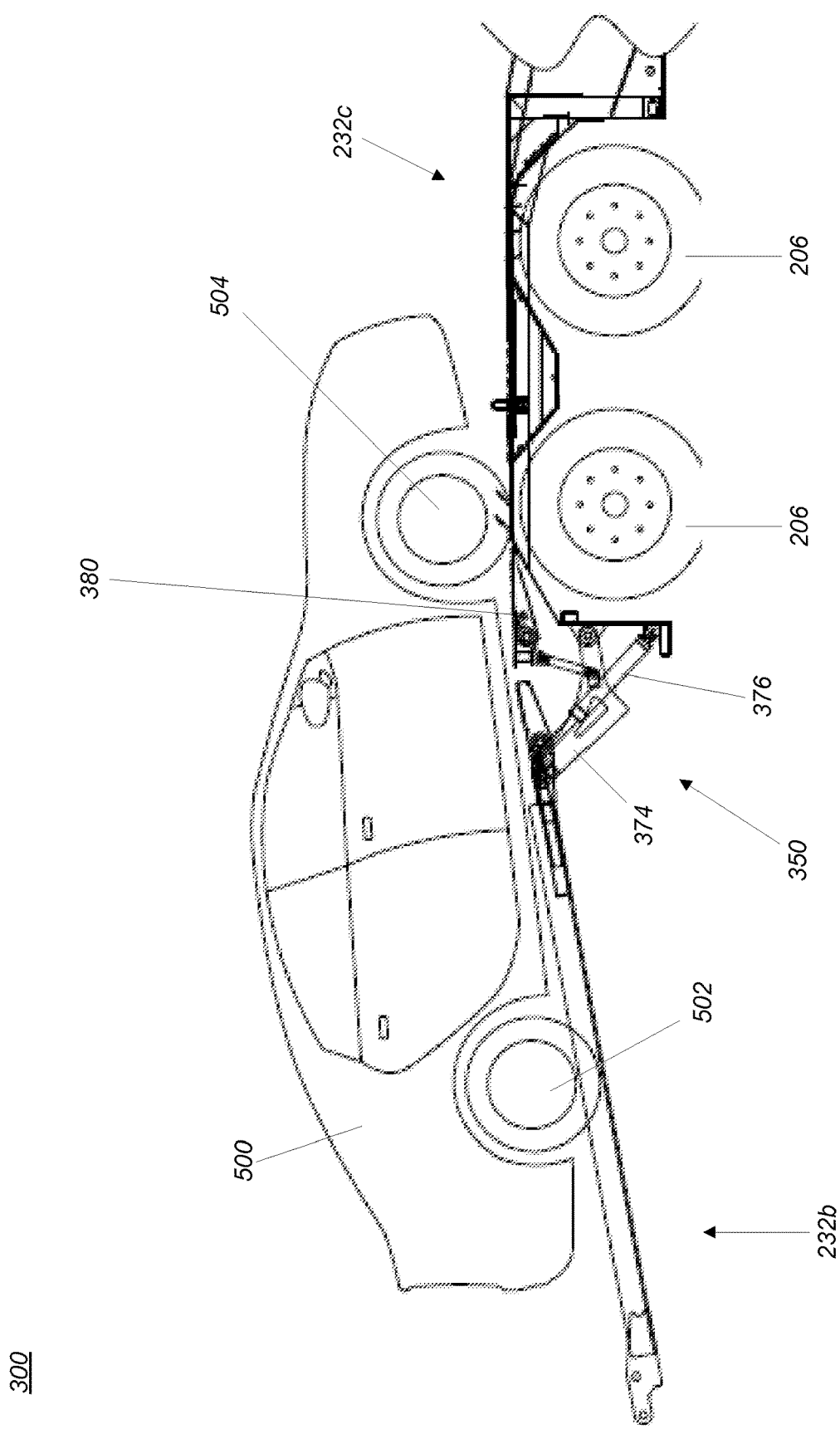

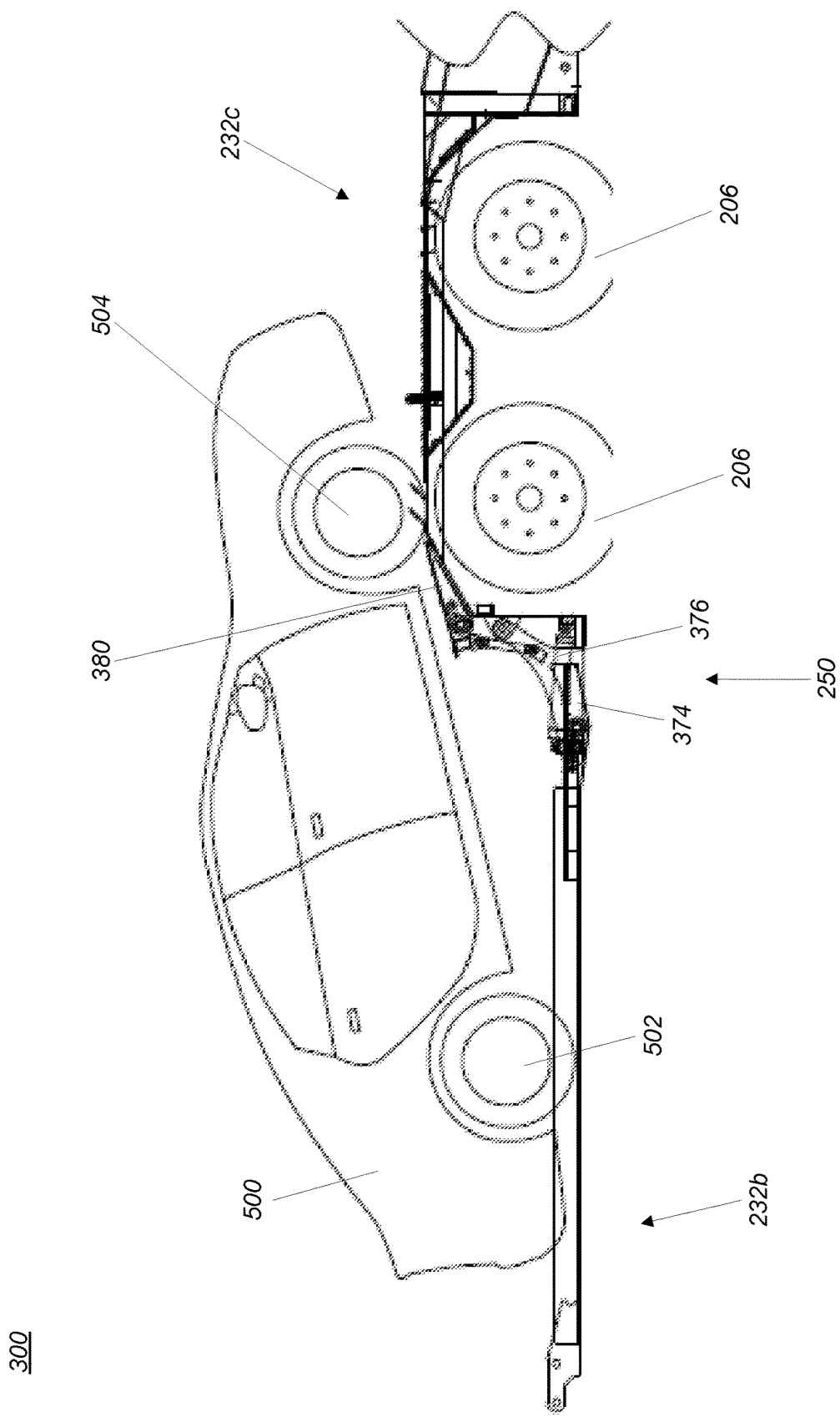

BRIDGE APPARATUS AND SYSTEM FOR VEHICLE TRANSPORT

DESCRIPTION OF THE RELATED ART

The present invention relates generally to transporting vehicles, and more particularly to an improved bridge apparatus and system for allowing cars to enter, exit, and transition through vehicle transport trailers and/or other vehicle transport systems. As is understood in art, vehicles such as automobiles, sport utility vehicles ("SUV"), etc. can be transported via transport trailers ("trailer") that are specifically designed to transport vehicles. Multiple vehicles can be transported on such a trailer. It is also known to implement multiple levels or tiers on such trailers to maximize the number of vehicles transported. For example, many trailers implement upper platforms and lower platforms such that two levels of vehicles may be transported at the same time. Each vehicle is secured to the trailer in some fashion, such that each vehicle will be restrained to one of the upper level or platforms, or the lower level or platforms, such as by straps or chains.

Generally, vehicles on the lower platforms of the trailer are loaded after the vehicles on the upper platforms have been loaded and secured and after the upper platforms have been placed in a raised position. In order to load vehicles onto the "front" part of the lower platforms of the trailer (i.e. the part or portion of the lower platform closest to the truck to which the trailer is attached), an adjustable bridge mechanism may be used. The bridge mechanism allows for vehicles to be driven past the wheels of the trailer onto the rear part of the front lower platform when the upper platforms are in a raised position. In some previous trailers, the bridge mechanism is a fixed bridge extending from the rear wheels towards the front of the trailer.

To make the process of positioning vehicles on trailers more efficient, movable bridge mechanisms known in the art may be raised to allow for vehicles to transition from one part of the lower platform, over the rear wheels of the trailer, and onto another part of the lower platform. Such movable bridge mechanisms may be lowered out of the way to allow vehicles to be secured in a manner that optimizes the space available and prevents the underside of the vehicle, when the vehicle is in its final transport position, from contacting the bridge mechanism. However, these prior art bridge mechanisms require manually lifting each mechanism separately upwards and securing it into place, such as with retracting legs which must also be secured manually into place for each bridge mechanism. These prior art bridge mechanisms can be time consuming to operate, requiring for instance raising and securing (or lowering and securing) the bridge mechanism for one side of the lower platform, walking around the trailer, and then raising and securing (or lowering and securing) the bridge mechanism for the other side of the lower platform. Accordingly, what is needed is an improved lift system that overcomes the shortcomings of the previous implementations.

SUMMARY OF THE DISCLOSURE

Improved bridge apparatuses and systems for vehicle transportation are disclosed. In an embodiment, a system for use with a vehicle transport trailer or truck includes at least one platform configured to receive vehicles. The platform includes at least a first section extending towards a wheel supporting the platform and a second section located above the wheel. The first section of the platform is configured to move to at least a raised position and a lowered position. The system includes a ramp with a first end rotatably coupled adjacent to the second section of the platform. The ramp is configured to move to at least a raised position and a lowered position, such that the ramp allows a vehicle to transition between the first section of the platform and the second section of the platform when the ramp is in the raised position.

The system further includes a linkage mechanism with a first end rotatably coupled adjacent to the first end of the ramp, and a second end coupled adjacent to the first section of the platform. The linkage mechanism is configured to move in conjunction with the first section of the platform such that moving the first section of the platform to the raised position causes the linkage mechanism to move the ramp to the raised position, placing the ramp substantially aligned with the first section of the platform; and moving the first section of the platform to the lowered position causes the linkage mechanism to move the ramp to the lowered position not aligned with the first section of the platform.

Other systems, apparatuses, and/or methods of using the same will be or become apparent to one with skill in the art upon review of the following drawings and detailed description. It is intended that all such additional systems, apparatuses, and/or methods of using the same be included within this description, be within the scope of the exemplary embodiments, and be protected by the accompanying claims.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

FIG. 5A illustrates a side view of aspects of the improved bridge system implemented on a trailer, with the bridge system in a raised position; and FIG. 5B illustrates a side view of aspects of the improved bridge system implemented on a trailer, with the bridge system in a lowered position.

DETAILED DESCRIPTION

The word "exemplary" is used herein to mean "serving as an example, instance, or illustration." Any aspect described herein as "exemplary" is not necessarily to be construed as preferred or advantageous over other aspects.

Exemplary embodiments include an improved lift apparatus and system that may be used to transport vehicles such as automobiles, sport utility vehicles ("SUV"), etc. Although discussed below with respect to vehicle transport trailers ("trailer") designed to be attached to/decoupled from a truck, the embodiments and inventions disclosed herein are equally applicable to other vehicle transport systems such as for example, a truck with permanently attached vehicle transporting systems, tow trucks, etc. An exemplary vehicle transport trailer 100 with which embodiments of the improved bridge apparatus and system for trailers may be used is illustrated in FIG. 1.

Figure 1:
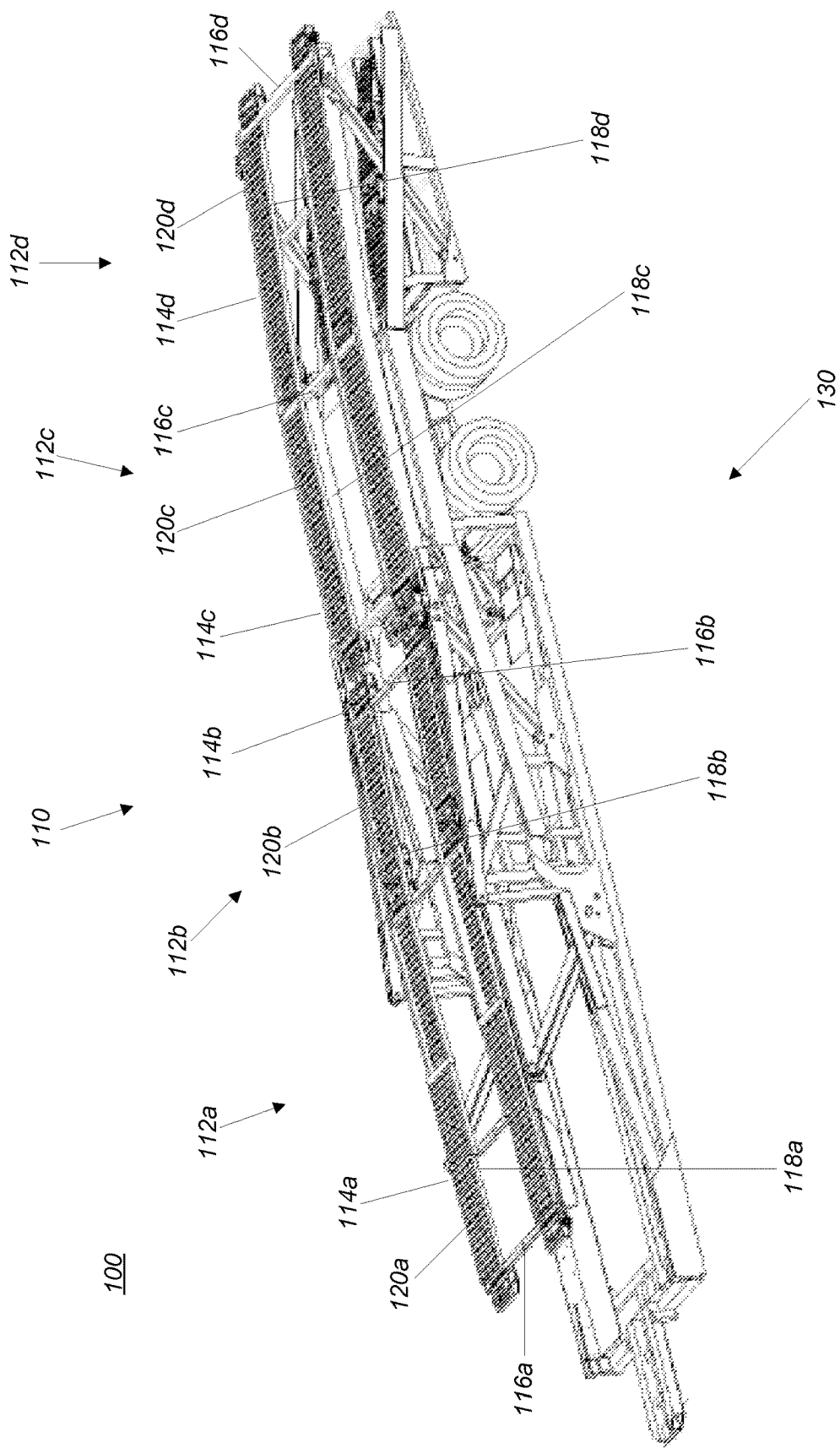
FIG. 1 illustrates a perspective view of a vehicle trailer with which the disclosed improved bridge apparatus and system may be implemented.

FIG. 1 shows a multi-level vehicle transport trailer 100 in a collapsed configuration. The trailer 100 includes an upper platform 110 comprising two parallel tracks that allow for securing and transporting vehicles. The illustrated upper platform 110 includes multiple portions or sections 112a-112d. Each section 112a-112d comprises an outer frame formed by parallel side rails 114a-114d and end rails 116a-116d connecting the side rails 114a-114d. Inner walls 118a-118d are provided parallel to the side rails 114a-114d of each upper section 112a-112d, with decking 120 between the side rails 114a-114d and inner walls 118a-118d. The side rails, 114a-114d, inner walls 118a-118d, and decking 120a-120d are sized and spaced so that vehicles may be driven onto, and secured to, the upper platform 110 with the cars left and right tires on the decking 120a-120d. The decking 120a-120d typically includes a plurality of holes and/or grating, and the decking 120a-120d may include roughened portions on the upper surface to allow vehicle tires to better grip the decking 120a-120d when the vehicles are secured to the upper platform 110.

The trailer 100 also includes a lower platform 130 similar to the upper platform 110 described above, the lower platform 130 may comprise multiple sections or portions as described above. When the trailer 100 is in a first, collapsed position as illustrated in FIG. 1, the upper platform 110 covers or hides the lower platform 130, such as to allow vehicles to be loaded onto or off of the upper platform 110 or to secure the trailer 100 when being transported without any vehicles. When the trailer 100 is in a second, extended position (not illustrated), the upper platform 110 is separated from the lower platform, such as to allow vehicles to be loaded onto or off of the lower platform 130 and/or to transport the trailer 100 when loaded with vehicles. As will be understood, various additional support or bracing members and a hydraulic, pneumatic, or other system may be included in the trailer 100 to allow the upper platform 110 to be extended away from and/or collapsed towards the lower platform 130, as well as to support the upper platform 110 when in an extended position and loaded with vehicles.

Figure 2:
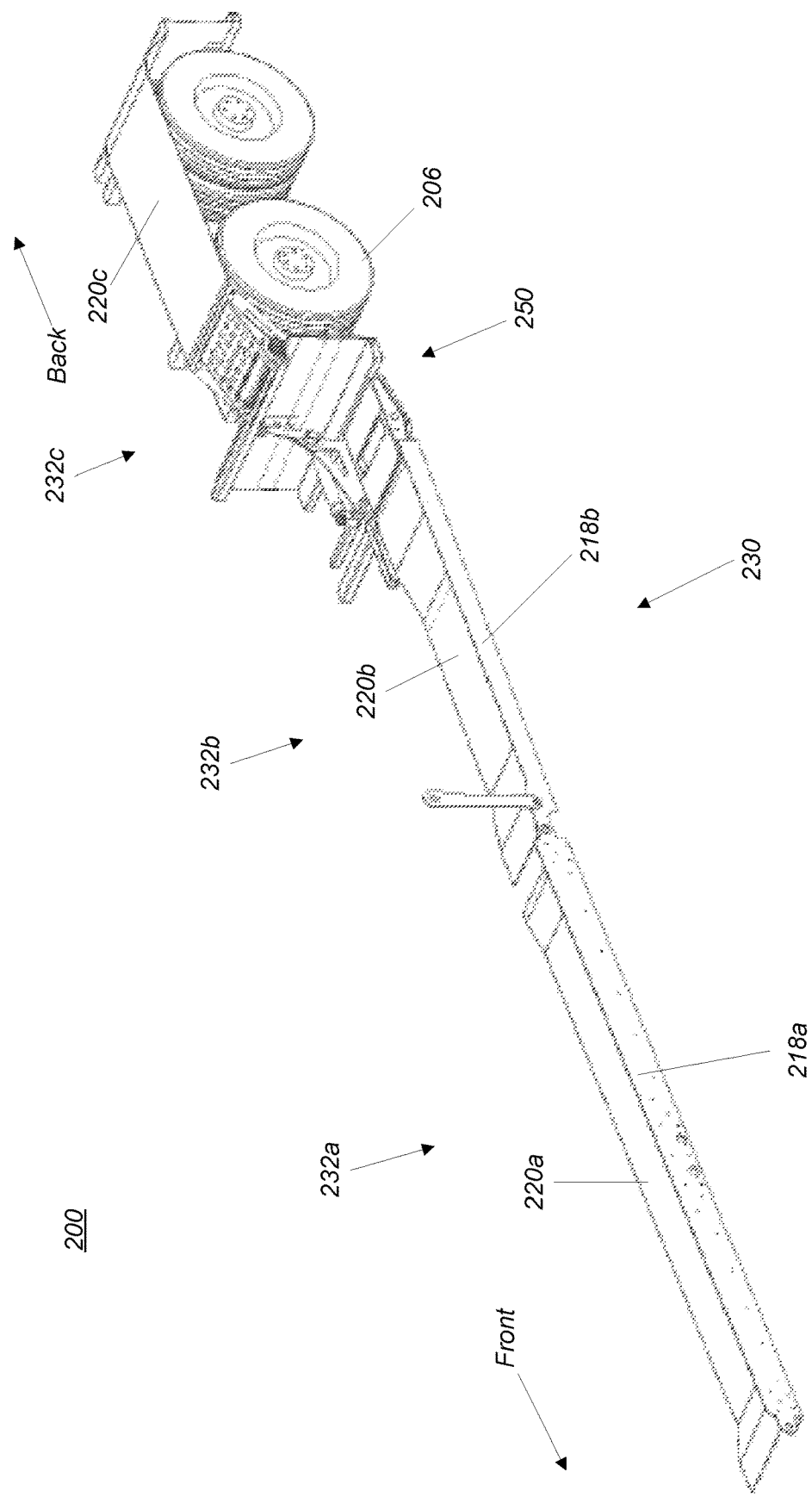
FIG. 2 illustrates a perspective view of a portion of the vehicle trailer of FIG. 1 with an embodiment of an improved bridge system.

FIG. 2 shows a perspective view of an embodiment of an improved bridge system and mechanism that may be implemented on a vehicle transport trailer. In FIG. 2, only a portion 230 of a transport trailer 200 is illustrated for clarity. It will be understood that trailer 200 illustrated in FIG. 2 may be similar to trailer 100 illustrated in FIG. 1. The illustrated portion 230 of the lower platform includes sections 232a and 232b that are in "front" of the rear wheels 206 of trailer 200, where the "front" end of the trailer 200 (labeled as "Front" in FIG. 2) may be attached to a tractor or truck (not shown) that tows the trailer 200. The illustrated portion 230 of the lower platform also includes a section 232c that approximately covers left wheels 206 and extends towards a "back" end of the trailer 200 (labeled as "Back" in FIG. 2). As will be understood, the improved bridge system and mechanism may be implemented on vehicle transport trailers containing a differently configured platform, including a trailer having a lower platform with fewer sections than illustrated in FIG. 2, or a trailer having only one platform instead of upper and lower platforms.

Throughout this disclosure, "front" or "forward" will correspond with the end of the trailer 200 or direction labeled "Front" in FIG. 2. Similarly, "back" or "backward" will correspond with the end of the trailer 200 or direction labeled "Back" in FIG. 2. In the embodiment of FIG. 2, the illustrated portion 230 comprises part of the left-side of the lower platform of trailer 200. As will be understood (and as illustrated in FIG. 1) trailer 200 will also include a corresponding right side of the lower platform which is not separately shown for clarity. In an embodiment, this right side of the lower platform will contain the same features illustrated in FIG. 2 and discussed below to allow loading, securing, and carrying of vehicles on trailer 200.

As will be understood, at least the second section 232b of the lower platform may be raised to at least one elevated or upper position and at least one lowered or down position. The elevated position, when the bridge system 250 is engaged, allows vehicles to be driven from the third section 232c to sections 232b and 232a in order to load vehicles onto those parts of the lower platform for transport and/or to allow vehicles transported on sections 232a/232b to be driven to section 232c when offloading the vehicles from the trailer 200. The lowered position (or multiple lowered positions) allows for section 232b to be lowered once vehicles are secured to the lower platform so that upper platform (see upper platform 110 of FIG. 1) may be lowered to transport vehicles and/or to load vehicles to/offload vehicles from the upper platform. In the illustrated embodiment, the "back" end of section 232b may be raised to the elevated position(s), while the "front" end of section 232b may or may not be raised or lowered. As illustrated in FIG. 2, a bridge system 250 may be implemented to allow vehicles to transition between the "front" end of section 220c and "back" end of section 232b. The bridge system 250 may be made of metal or any other appropriate material and the bridge system is illustrated in FIG. 2 in a lowered or down position.

Figure 3A:
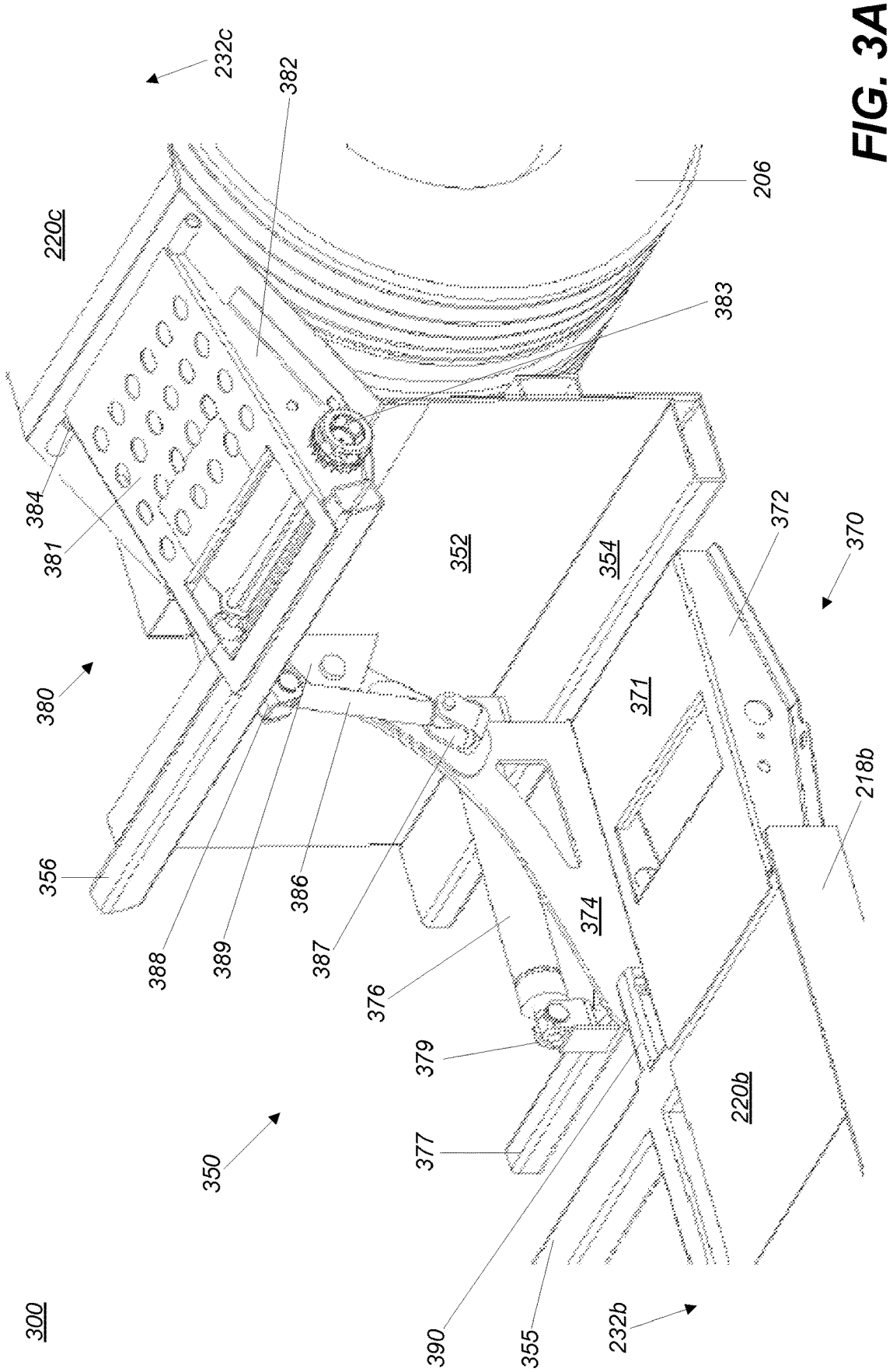
FIG. 3A illustrates a perspective view of aspects of an embodiment of the improved bridge system, with the bridge system in a lowered position.
Figure 3B:
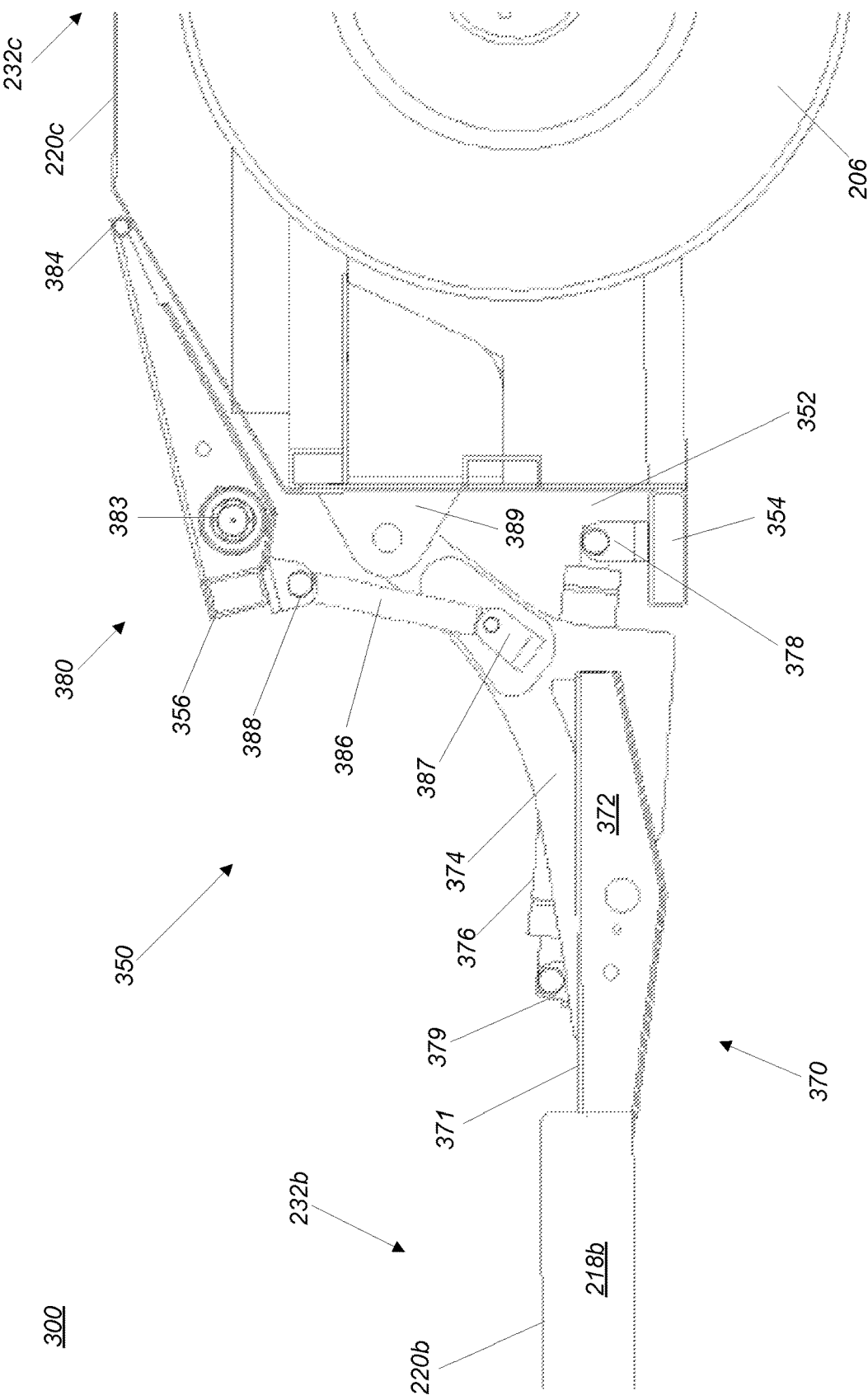
FIG. 3B illustrates a side view of aspects of the improved bridge system of FIG. 3A.
Figure 4A:
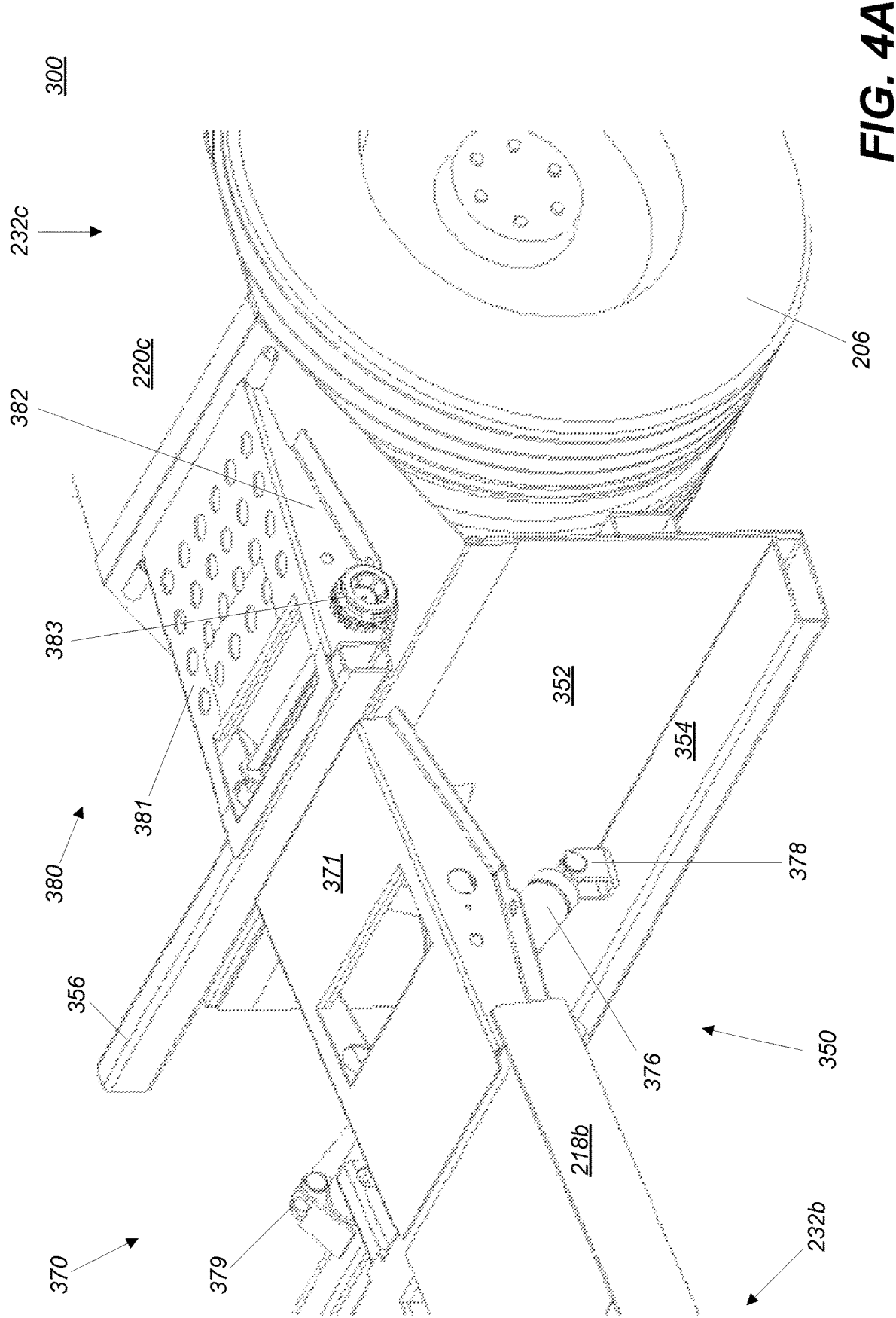
FIG. 4A illustrates a perspective view of aspects of the embodiment of the improved bridge system of FIG. 3A, with the bridge system in a raised position.
Figure 4B:
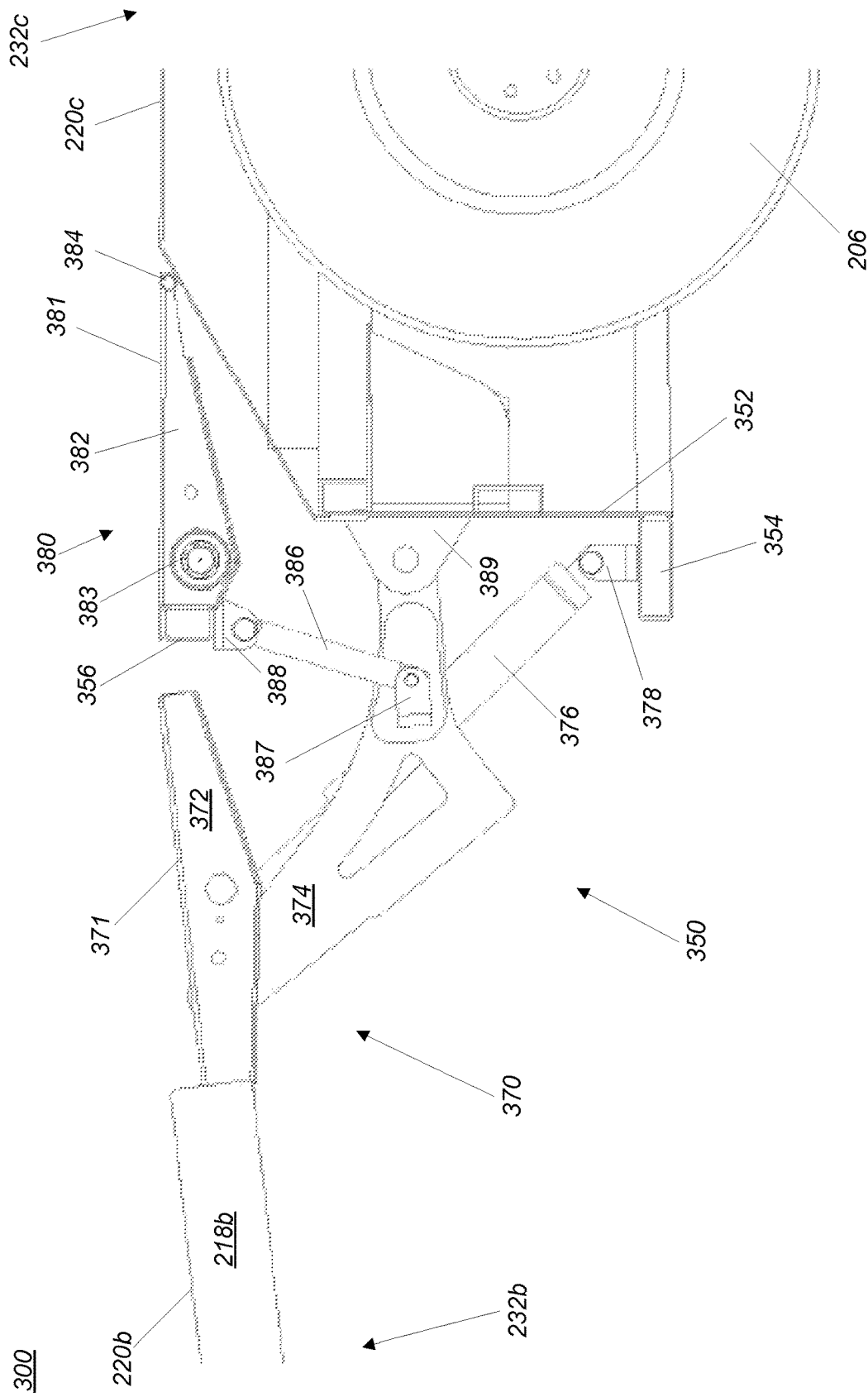
FIG. 4B illustrates a side view of aspects of the improved bridge system of FIG. 4A.

Turning to FIGS. 3A-3B and 4A-4B, an embodiment of a bridge system 350 are illustrated. Bridge system 350 of FIGS. 3A-3B and 4A-4B may be implemented as the bridge system 250 on the lower platform of trailer 200 of FIG. 2 (or trailer 100 of FIG. 1). Only a portion of one side of a lower platform of a trailer 300 is illustrated in FIGS. 3A-3B and 4A-4B for clarity. FIG. 3A shows a perspective view of the embodiment of the bridge system 350 in a lowered position, while FIG. 3B is a side view of the bridge system 350 of FIG. 3A in the lowered position. FIG. 4A shows a perspective view of the embodiment of the bridge system 350 in a raised position, while FIG. 4B is a side view of the bridge system 350 of FIG. 4A in the raised position. As illustrated in FIGS. 3A-3B and 4A-4B, an embodiment of bridge system 350 may comprise a movable ramp 380 and a linkage system 370 (which may include features 371, 372, 374, and 376-379 and/or 386-389) configured to couple the ramp 380 to section 232b of the lower platform of trailer 300. Sections 232b and 232c of FIGS. 3A-3B and 4A-4B may be the same as sections 232b/232c of FIG. 2, including the features discussed above such as side wall 218b and/or decking 220b/220c.

Ramp 380 may comprise a front end (the end closest to the "Front" of trailer 300 and adjacent to section 232b) and a back end (the end closest to the "Back" of trailer 300 and adjacent to section 232*c*). Ramp 380 may include decking 381 supported by two parallel walls 382 extending downwards from the underside of decking 381. Decking 381 and walls 382 may be formed from a single piece, such as by folding the edges of the decking 381 to form walls 382. In other embodiments, the ramp 380 may comprise a decking 381 affixed to separate walls 382. In operation, ramp 380 allows vehicles to be driven between sections 232*b* and 232*c* and to be stored on trailer 300 for transport. To assist with these functions, decking 381 may be made of metal or any other appropriate material and may include a plurality of holes, grating, and/or roughened portions on the upper surface to allow vehicle tires to better grip the decking 381 when the vehicles are driven on and/or secured to the lower platform of trailer 300. For example, in the illustrated embodiment, decking 381 may include an opening to allow straps or chains to secure a vehicle, such as using a ratchet 383 extending through one or more walls 382 of ramp 380.

Ramp 380 is configured to allow movement between a lowered position (FIGS. 3A-3B) and a raised position that is substantially aligned with section 232*c* of trailer 300 (FIGS. 4A-4B) to allow vehicles to move from section 232*c* over ramp 380 to section 232*b* (and to also move in the reverse direction). In some embodiments, ramp 380 may be aligned with section 232*c* such that these two portions are substantially parallel or co-planar. In other embodiments, ramp 380 and section 232*c* may be aligned even though there is an angle formed between the ends of ramp 380 and section 232*c*.

In an embodiment, the decking 381 at the front end of ramp 380 may extend beyond the ends of walls 382 to form a lip affixed to a ramp support which is illustrated as a metal tube 356 in the figures. Tube 356 may in turn be coupled to one end of rod 386 of linkage system 370 which supports the front end of ramp 380 in the raised position (FIGS. 4A-4B) and also moves ramp 380 between the raised and lowered positions as discussed below. At its back end, ramp 380 may be coupled to trailer 300, such as to a portion of section 232*c* to allow the ramp 380 to move between the raised and lowered positions. In an embodiment, the back end of the ramp 380 may be rotatably coupled to section 232*c*, such as by hinge 384 which may comprise a bolt or pin through a bracket affixed to section 232*c* or a welded rod. For such embodiments, moving between the raised and lowered positions may comprise the ramp 380 rotating around hinge 384 such that only the front end of the ramp 380 is moved between the lowered position (FIGS. 3A-3B) and the raised position (FIGS. 4A-4B).

The illustrated bridge system 350 also comprises a linkage system 370 configured to couple the ramp 380 to section 232*b* of the lower platform of trailer 300. Linkage system 370 allows ramp 380 to automatically raise and lower along with section 232*b*, greatly improving the functionality and ease of use of bridge system 350 over previous systems. As will be understood, section 232*b* may be moved to a raised or upper position to allow transition of vehicles from section 232*c* over rear wheels 206 of trailer 300 (for loading or unloading vehicles onto sections 232*a* and 232*b*). Section 232*b* may also be moved to a lowered or down position once vehicles have been secured to section 232*b* (or to allow upper platform 110 of FIG. 1 to be lowered to unload vehicles). Such movement of section 232*b* may be performed by a hydraulic system or other powered or mechanical mechanism such as actuator 376.

Linkage system 370 in an embodiment may comprise an arm 374 with a front end of arm 374 rotatably coupled to the back end of section 232*b*. In other embodiments, the arm 374 may be part of a lifting system. In the illustrated embodiment, a back end of arm 374 may be rotatably coupled to the trailer 300 adjacent to section 232*c* or may be rotatably coupled to section 232*c* itself. Arm 374 may be any desired shape or material. In the illustrated embodiment, arm 374 is rotatably coupled at one end to a support structure comprising a back wall 352 coupled to the trailer 300 and a shelf 354 attached to the bottom edge of the back wall 352. Arm 374 may also be rotatably coupled at the other end to the platform. Back wall 352 may be substantially rectangular in shape, formed of metal, and may extend downwards perpendicular to the top surface of section 232*c*. Shelf 354 may comprise a rectangular metal tube affixed along a bottom edge of back wall 352 as illustrated. In an embodiment, the back end of arm 374 is rotatably coupled to back wall 352 in a way that allows the arm 374 to rotate in an upwards and downwards direction (i.e. in a direction perpendicular to section 232*c*). Back end of arm 374 may be coupled to the back wall by any desired means, such as a hinge, or by attaching the arm 374 to a bracket 389 extending from (or affixed to) back wall 352 with a pin or bolt as illustrated in FIGS. 3A-3B and 4A-4B.

As illustrated in FIGS. 3A-3B and 4A-4B, the linkage system 370 may also include or may be coupled to a rod 386 that is rotatably coupled at one end to the tube 356 supporting the front end of ramp 380. Rod 386 may be any desired shape or material and, in the illustrated embodiment, is solid metal that is generally cylindrical. The first end of rod 386 may be rotatably coupled to the tube 356 in any desired manner, such as by a bolt or pin in a bracket 388 extending from or attached to the underside of tube 356 as shown in FIGS. 3A-3B and 4A-4B. The second end of rod 386 is rotatably coupled to arm 374. As illustrated, the second end of rod 386 may be rotatably coupled to one side or surface of arm 374 relatively near or adjacent to the back end of arm 374 that is coupled to the back wall 352. The second end of rod 386 may also be coupled to the arm 374 in any desired manner, such as by a bolt or pin in a bracket 387 extending from or attached to one side or surface of the arm 374 as shown in the figures. In operation, rod 386 serves to allow ramp 380 to automatically move in conjunction with section 232*b* of the lower platform of trailer 300. Rod 386 also serves to provide support for the front end of ramp 380 when the ramp 380 is in a raised or upper position (see FIGS. 4A-4B), holding the ramp 380 in place in the raised or upper position such that separately operated support legs are not needed as in prior systems.

Returning to the arm 374, the front end of arm 374 is coupled to a back end of section 232*b*. In an embodiment, the front end of arm 374 may be coupled to a tube 390 coupled to section 232*b* where the tube 390 is configured to slide into and out of section 232*b*. In another embodiment, the front end of arm 374 may be coupled directly to section 232*b*, such as to one of the side walls 218*b* of a back end of section 232*b*. In yet other embodiments, the arm 374 may be coupled to a support 355 located underneath and supporting the back end of section 232*b* as illustrated in FIGS. 3A-3B and 4A-4B. Support 355 may be a series of intersecting metal tubes (such as in an "H" or "#" pattern) providing support for the back end of section 232*b*. The front end of arm 374 is coupled to the back end of section 232*b* in a manner to allow the front end of arm 374 to raise and/or lower in conjunction with the back end of section 232*b*. For example as illustrated in FIGS. 3A-3B and 4A-4B, the front end of arm 374 may rotate about its back end that is affixed to the back wall 352 such that the front end of arm 374 may raise and lower with the back end of section 232b. As discussed above, the movement of arm 374 in conjunction with section 232b allows for the front end of ramp 380 to also raise and lower in conjunction with section 232b via rod 386.

In an embodiment, the back end of section 232b may include a transition portion comprising transition decking 371 supported by two parallel walls 372 extending downwards from the underside of transition decking 371. Transition decking 371 and walls 372 may be formed from a single piece, such as by folding the edges of the transition decking 371 to form walls 372. In other embodiments, the transition decking 371 may comprise a separate piece attached to the walls 372. Transition decking 371 may be made of metal or any other appropriate material and may include a plurality of holes, grating, and/or roughened portions on the upper surface to allow vehicle tires to better grip the decking 371 when the vehicles are driven on and/or secured to section 232b. The transition decking 371 may include an opening to allow straps or chains to secure a vehicle. In other embodiments, no transition portion may be implemented.

Linkage system 370 may also include or may be coupled to an actuator 376 configured to lift the arm 374 and/or to provide support to the back end of section 232b, such as when the back end of section 232b is in a raised or upper position. In an embodiment, the actuator 376 may comprise any mechanical, electrical, hydraulic, or other means for lifting arm 374 and/or providing support to the back end of section 232b. For example, actuator 376 may comprise a telescoping member, such as a piston, where the piston is in a "closed" configuration and positioned out of the way, generally parallel to section 232b when section 232b is in a lowered or down position. In such embodiments, the actuator 376 is in an "open" or "extended" configuration when section 232b is in a raised or upper position, helping to support the back end of section 232b to allow vehicles to transition to and from section 232b. As illustrated in FIGS. 3A-3B and 4A-4B, actuator 376 may comprise a generally cylindrical telescoping member or piston and may provide support to the back end of section 232b by hydraulic, electrical, or any other desired method.

Actuator 376 may be coupled to trailer 300 by any desired method. For example, a first end of actuator 376 may be rotatably coupled to a cross beam 377 affixed to a side of arm 374. As illustrated, cross beam 377 may extend from arm 374 such that cross beam 377 lies parallel to the width of the platform/perpendicular to the length of the platform of trailer 300 (or perpendicular to the length of section 232b). In such embodiments, actuator 376 may be rotatably coupled to cross beam 377 by any desired method such as via a bolt or pin through a bracket 379 extending from or attached to a top surface of cross beam 377 as illustrated. In other embodiments or implementations of the system, the first end of actuator 376 may be rotatably attached to arm 374, section 232b, or another part of trailer 300 rather than to cross beam 377 if desired. Similarly, a second end of actuator 376 may be rotatably coupled to the shelf 354 as illustrated in FIGS. 3A-3B and 4A-4B, such as via a pin or bolt through a bracket 378 extending from or attached to a top surface of shelf 354. In other embodiments, the second end of actuator 376 may be rotatably attached to the back wall 352 or another portion of trailer 300 rather than to shelf 354.

Additionally, actuator 376 and/or bracket 379 may be located at a different position than that illustrated in FIGS. 3A-3B. For example, in another embodiment (not illustrated), actuator 376 may be located on the "outside" of section 232b instead of located in the "interior" of section 232b as illustrated. In such embodiment, a first end of actuator 376 may be rotatably coupled to the side of sidewall 218b (such as by a modified version of bracket 379). Additionally, the second side of actuator 376 may be rotatably affixed to back wall 352 at a different location than that illustrated in FIGS. 3A-3B. As will be understood, additional locations for and configurations of actuator 376 are also possible.

In operation, the bridge system 350 of FIGS. 3A-3B and 4A-4B move automatically to a raised or elevated position when section 232b (or the back end of section 232b) is moved to a raised or elevated position. This automatic movement in conjunction with section 232b means that the bridge system 350 is always in place when vehicles are transitioning between section 232b and 232c, such as for loading vehicles onto or offloading vehicles from trailer 300 (or trailer 100 of FIG. 1). FIG. 5A shows aspects of a bridge system 350 implemented on a trailer 300, which may be a trailer like that illustrated in FIG. 1 or any other type of car transport trailer including a trailer with a single platform rather than upper and lower platforms. Only a portion of trailer 300 is illustrated in FIG. 5A for clarity. As shown in FIG. 5A, when section 232b is in a raised or elevated position, bridge system 350 is also in a raised or elevated position such that ramp 380 is aligned with section 232b. In this configuration, vehicle 500 may be loaded onto trailer 300 by driving vehicle 500 onto the lower platform, over section 232c of the lower platform positioned over the trailer wheels 206, and onto (or partially onto) section 232b of the lower platform of trailer 300. As will be understood, this movement may be reversed to allow vehicle 500 to be removed from trailer 300. As will also be understood, in an embodiment, section 232b may be towards the "rear" of the trailer 300 rather than to the "front" of the trailer 300 as illustrated in FIG. 5A.

Similarly, in operation, bridge system 350 automatically moves to a down or one or more lowered positions when section 232b (or the back end of section 232b) is lowered. This ensures that bridge system 350 is automatically out of the way to create more space for the vehicle and, in turn, to allow the vehicle to be more efficiently secured to the trailer 200/300. For example, FIG. 5B shows aspects of the bridge system 350 implemented on the trailer 300 of FIG. 5A with the bridge system 350 (and platform section 232b) in a lowered or down position. Again, only a portion of trailer 300 is illustrated in FIG. 5B for clarity. As shown in FIG. 5B, when section 232b is in the down or lowered position, bridge system 350 is also in a down or lowered position such that ramp 380 is out of the way allowing vehicle 500 to be secured to trailer 300 in a "straddle" position with a first wheel 502 of the vehicle 500 secured to section 232b and a second wheel 504 of the vehicle 500 secured to section 232c.

Thus, the movement of ramp 380 out of the way when section 232b is lowered provides great benefit when transporting vehicles with low ground clearance, allowing more options when securing such low-to-the-ground vehicles to the lower platform of the trailer 200/300. Further, the ability to automatically move the ramp 380 in conjunction with section 232b provides another benefit by avoiding the need to manually raise/lower previous ramps and to manually secure/unsecure supporting legs for the previous ramps. This additional benefit is increased when a bridge system 350 is implemented on both the left side of lower platform (as illustrated in the figures) and the right side of the lower platform (not illustrated).

Only one bridge system 350 for the lower platform of trailer 200/300 has been illustrated for clarity. In some embodiments, left-side and right-side versions of bridge system 350 may be coupled together, one for each side of the lower platform. In such embodiments, both left-side and right-side bridge systems 350 automatically raise and lower at the same time with section 232b (or with the back end of section 232b). In some embodiments, the right-side bridge system will be a mirror image of the left-side bridge system, such that each of the right-side bridge system and the left-side bridge system has all of the features discussed above for bridge system 350.

However, it is not necessary that both the left-side and right-side bridge systems have all of the components discussed above. For example, in another embodiment, a left-side bridge system for the lower platform of trailer 300 may be implemented as illustrated in FIGS. 3A-3B and 4A-4B while a right-side bridge system does not include an additional arm like arm 374. For such embodiments, the right-side ramp is connected to the left-side ramp such as by dimensioning tube 356 supporting the front end of left-side ramp to extend to the right-side bridge system.

In this manner, dimensioning tube 356 may also support right-side ramp and/or ensure that right-side ramp moves upward and downward in conjunction with left-side ramp (and therefore also in conjunction with section 232b). Similarly, a right-side rod may be implemented in this embodiment to support right side ramp. For example, the right-side rod may be rotatably affixed on one end to the dimensioning tube 356 and on the other end to cross beam 377 (or to another part of the trailer 300 or section 232b) to allow the right-side rod to support right-side ramp. As will be understood, other configurations of a bridge system 350 comprising a left-side bridge system coupled with a right-side bridge system may be implemented with differing combinations of the features illustrated for bridge system 350 in FIGS. 3A-3B and 4A-4B.

Although the present bridge system 250/350 has been discussed in terms of a single raised or elevated position and a single lowered or down position, other intermediate positions are possible. For example, in some embodiments, section 232b may be configured to move to multiple raised, lowered, or intermediate positions for various purposes. For such embodiments, bridge system 250/350 may be configured to move ramp 380 and the other components of bridge system 250/350 along with section 232b to the various raised, lowered, or intermediate positions. Alternatively, bridge system 250/350 to move ramp 380 and/or the other components of bridge system 250/350 to a single raised/elevated position when section 232b is in its highest elevated position (e.g. for transitioning vehicles). In these alternative embodiments, bridge system 250/350 may be configured to move ramp 380 and/or the other components of bridge system 250/350 to a single lowered/down position when section 232b is moved to any other position such as a lowered/down position and any intermediate positions.

Additionally, although the present bridge system 250/350 has been discussed in terms of fixedly moving ramp 380 in conjunction with section 232b, other implementations are possible. For example, part or all of bridge system 250/350 may be adjustable such that the amount ramp 380 moves with section 232b varies as desired. For such adjustable implementations, it may be possible to manually or automatically adjust the amount that ramp 380 moves with section 232b, including implementations where ramp 380 may not move at all with section 232b (or where ramp 380 may be moved independently of section 232b). In one example, rod 386 may be manually adjustable or automatically adjustable with an actuator to allow variable movement of ramp 380 with section 232b.

While the invention has been described with reference to exemplary embodiments, it will be understood by those skilled in the art that various changes may be made and equivalents may be substituted for elements thereof without departing from the scope of the disclosure, including the alternate embodiments discussed above. In addition, many modifications may be made to adapt a particular situation or material to the teachings of the invention without departing from the essential scope thereof. Therefore, it is intended that the disclosure not be limited to the particular embodiments discussed, but that the disclosure will include all embodiments falling within the scope of the claims. Moreover, the use of the terms first, second, etc., do not denote any order or importance, but rather the terms first, second, etc. are used to distinguish one element from another. Furthermore, the use of the terms a, an, etc., do not denote a limitation of quantity, but rather denote the presence of at least one of the referenced item. Similarly, use of the terms set, plurality, etc., also do not denote a limitation of quantity, but rather denote the presence of at least two of the reference item.

What is claimed is:

1. A vehicle transport truck or trailer comprising:
   at least one platform configured to receive vehicles, the platform comprising at least a first section extending towards a wheel of the vehicle transport truck or trailer and a second section located above the wheel, the first section of the platform configured to move to at least a raised position and a lowered position;
   a first ramp with a front end and a rear end, the rear end rotatably coupled to the second section of the platform, the first ramp configured to move to at least a raised position and a lowered position, the first ramp configured to allow a vehicle to transition between the first section of the platform and the second section of the platform when the ramp is in the raised position; and
   a linkage mechanism with a first end rotatably coupled to the front end of the first ramp and a second end coupled to the first section of the platform, the linkage mechanism configured to move in conjunction with the first section of the platform,
   wherein moving the first section of the platform to the raised position causes the linkage mechanism to move the first ramp to the raised position placing the first ramp substantially aligned with the first section of the platform, and
   moving the first section of the platform to the lowered position causes the linkage mechanism to move the first ramp to the lowered position not aligned with the first section of the platform.

2. The vehicle transport truck or trailer of claim 1, further comprising:
   a support mechanism with a first end rotatably coupled to the linkage mechanism and a second end rotatably coupled to the first ramp, the support mechanism configured to support the first ramp when the first ramp is in the raised position substantially aligned with the first section of the platform.

3. The vehicle transport truck or trailer of claim 2, further comprising:
   an actuator coupled to the linkage mechanism, the actuator configured to move the first ramp in conjunction with the linkage mechanism.

4. The vehicle transport truck or trailer of claim 3, wherein the actuator comprises one of a mechanical actuator, electrical actuator, and hydraulic actuator.

5. The vehicle transport truck or trailer of claim 3, further comprising:
   a back wall affixed to the platform and extending downwards perpendicular to the second section of the platform, wherein the linkage mechanism is further rotatably coupled to the back wall; and
   a shelf affixed along a bottom edge of the back wall, wherein the actuator is further rotatably coupled to a top surface of the shelf.

6. The vehicle transport truck or trailer of claim 3, further comprising:
   a support coupled to the first section, wherein the linkage mechanism is rotatably coupled to the support.

7. The vehicle transport truck or trailer of claim 1, wherein the platform further comprises a third section parallel to the first section and a fourth section parallel to the second section, the fourth section located above a second wheel of the vehicle transport truck or trailer, wherein the first and second section of the platform comprise a left side of the platform and the third and fourth section of the platform comprise a right side of the platform parallel to the left side, the third section of the platform configured to move to at least a raised position and a lowered position, and
   wherein the vehicle transport truck or trailer further comprises a second ramp rotatably coupled to the fourth section of the platform, the second ramp configured to move to at least a raised position and a lowered position in conjunction with the first ramp.

8. The vehicle transport truck or trailer of claim 1, wherein:
   the first section of the platform is configured to move to at least one intermediary position between the raised position and the lowered position,
   the first ramp is configured to move to at least one intermediary position between the raised position and the lowered position, and
   moving the first section of the platform to the intermediary position caused the linkage mechanism to move the first ramp to the intermediary position.

9. A bridge system for coupling adjacent sections of a vehicle transport trailer, the bridge system comprising:
   left-side and right-side ramps interposed between a fixed level section of the vehicle transport trailer and a linkage system, wherein the linkage system is coupled to a height-adjustable section of the vehicle transport trailer and the ramps are rotatably connected to the fixed level section of the vehicle transport trailer;
   wherein actuation of the linkage system operates to raise or lower the height-adjustable section of the vehicle transport trailer, and simultaneously the ramps, such that at an upper most position the height-adjustable section is substantially aligned with the ramps to allow a vehicle to transition between the fixed level section and the height-adjustable section of the vehicle transport trailer; and
   wherein the height-adjustable section further comprises at least one transition decking component configured to align with at least one of the left-side and right-side ramps when the height-adjustable section is at the upper most position.

10. The bridge system of claim 9, wherein the height-adjustable section of the vehicle transport trailer is operable to be positioned at multiple positions in addition to the upper most position.

11. The bridge system of claim 9, wherein the fixed level section is located above one or more wheels of the vehicle transport trailer.

12. The bridge system of claim 11, further comprising a back wall component positioned beneath the left-side and right-side ramps and ahead of the one or more wheels.

13. The bridge system of claim 12, wherein the linkage system is further coupled to the back wall component.

14. The bridge system of claim 9, wherein the linkage system comprises at least one actuator.

15. The bridge system of claim 14, wherein the at least one actuator comprises one of a mechanical actuator, electrical actuator, and hydraulic actuator.

16. The bridge system of claim 9, wherein at least one of the left-side and right-side ramps comprises a ratchet system.

17. The bridge system of claim 9, wherein the left-side and right-side ramps are connected via a cross-bar component interposed between the ramps and the linkage system.

18. The bridge system of claim 9, wherein the left-side and right-side ramps are spaced to simultaneously accommodate left-side and right-side tires of a vehicle, respectively.

19. The bridge system of claim 9, wherein at least one of the left-side and right-side ramps comprises a perforated deck surface.

* * * * *